US007277728B1

(12) United States Patent
Kauhanen

(10) Patent No.: US 7,277,728 B1
(45) Date of Patent: Oct. 2, 2007

(54) BASE STATION OF A COMMUNICATION NETWORK, PREFERABLY OF A MOBILE TELECOMMUNICATION NETWORK

(75) Inventor: Jouni Kauhanen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/258,945

(22) PCT Filed: May 5, 2000

(86) PCT No.: PCT/EP00/04054

§ 371 (c)(1),
(2), (4) Date: Mar. 5, 2003

(87) PCT Pub. No.: WO01/86754

PCT Pub. Date: Nov. 15, 2001

(51) Int. Cl.
*H04B 1/38* (2006.01)
*H04M 1/00* (2006.01)

(52) U.S. Cl. ................ 455/561; 455/562.1; 455/575.8; 455/575.7

(58) Field of Classification Search ................ 455/561, 455/575.8, 560, 562.1, 575.7
See application file for complete search history.

(56) References Cited

U.S. PATENT DOCUMENTS 4,724,443 A 2/1988 Nysen
5,701,583 A * 12/1997 Harbin et al. ................. 455/25
5,742,255 A 4/1998 Afendras
5,905,465 A * 5/1999 Olson et al. ......... 343/700 MS
6,201,801 B1 * 3/2001 Dent .......................... 370/342
6,571,110 B1 * 5/2003 Patton et al. ............... 455/561
6,731,904 B1 * 5/2004 Judd ......................... 455/11.1
6,934,511 B1 * 8/2005 Lovinggood et al. ...... 455/11.1
2002/0058539 A1 * 5/2002 Underbrink et al. ........ 455/575

FOREIGN PATENT DOCUMENTS

EP 0847101 A2 * 10/1998
EP 0886336 A2 * 12/1998
GB 2332568 * 6/1999

OTHER PUBLICATIONS

Alevy, "Antenna Fundamentals for Microcellular Applications", www.cushcraft.com/pdf/antenna4.pdf.
"Antenna Performance and Design Considerations for Optimum Coverage in Wireless Communication Systems", p. 8, www.cushcraft.com/comm/support/pdf/Antenna-Performance-C-14B37.pdf.

* cited by examiner

*Primary Examiner*—Nay Maung
*Assistant Examiner*—Andrew Wendell
(74) *Attorney, Agent, or Firm*—Squire, Sanders & Dempsey, L.L.P.

(57) ABSTRACT

The invention relates to a base station of a communication network which comprises a casing, a transmitting and receiving device housed in the casing, and an antenna connected to the transmitting and receiving device. The antenna is formed as a patch antenna which comprises at least one receiving antenna patch and at least one transmitting antenna patch spatially separated from the receiving antenna patch. The receiving and transmitting antenna patches are preferably attached to the outside of the casing of the base station. Two or more separate receiving antenna patches may be connected to a common receiving feed line for connection to a receiving circuit of the base station. Likewise, two or more separate transmitting antenna patches may be connected to a common transmitting feed line for connection to a transmission circuit of the base station.

12 Claims, 5 Drawing Sheets

BASE STATION OF A COMMUNICATION NETWORK, PREFERABLY OF A MOBILE TELECOMMUNICATION NETWORK

BACKGROUND OF THE INVENTION

1. Field of the Invention

The invention relates to a base station of a communication network, preferably a mobile telecommunication network such as an GSM (Global System for Mobile Telecommunication) network, or a packet-switched network such as UMTS (Universal Mobile Telecommunications System), or GPRS (General Packet Radio Service) network.

2. Description of the Prior Art

Telecommunication systems for mobile telecommunication are widely used and require one or more base stations for covering a larger area by high frequency (rf) signals so as to allow serving of e.g. moving subscribers.

The base stations are equipped with an antenna for radiating and receiving rf signals. The antenna increases the outer dimensions of the base station and may also negatively affect the design and visual appearance of the base station. In particular, in case of base stations of a small size such as base stations to be mounted inside a building (e.g. for microcellular structures for indoor applications, or external installations in well visible places), the antenna may hinder the installation at a desired small place.

Furthermore, the physical size of present base stations may be rather small so that it may be difficult to connect the external antennas to the internal components of the base station in an efficient and yet uncomplicated manner. Furthermore, the transmitting and receiving requirements of base stations may be different so that it is difficult to optimize the antenna for these different requirements.

U.S. Pat. No. 5,742,255 discloses an antenna system for a mobile communication which is mounted on the window glass of a vehicle. The antenna system comprises a radiating antenna connected to a conductive plate cooperates with an inner layer, and a microstrip feedline for coupling the rf energy into the interior of the vehicle. The antenna system is quite bulky and necessitates appropriate mounting space.

U.S. Pat. No. 4,724,443 describes a patch antenna having a stripline feed element which is arranged in parallel between two conductive plates of the antenna. One of the plates is a ground plane and connected to the outer shielding of a coaxial cable. The inner conductor of the coaxial cable is connected to the stripline feed element and, at the other side, to an rf source. The antenna is a radiating antenna for transmitting energy to other devices.

SUMMARY OF THE INVENTION

The present invention is a base station of compact size and good efficiency.

According to the present invention, a base station is provided which comprises a casing, a transmitting and receiving device housed in the casing, and an antenna connected to the transmitting and receiving device, wherein the antenna is formed as a patch antenna which comprises at least one receiving antenna patch and at least one transmitting antenna patch.

Preferably, the receiving and/or transmitting antenna patch(es) are attached to the casing of the base station. The outer dimensions of the base stations therefore are not increased. For increasing the transmitting and receiving power, and/or for providing diversity, at least two separate transmitting or receiving antenna patches are provided which are connected to a common feed line for connection to a transmitting or receiving circuit of the base station.

The size of the receiving antenna patch(es) may be different from the transmitting antenna patch(es) so as to optimize the respective antennas to the different operational conditions such as different transmitting and receiving frequencies.

The casing of the base station preferably at least partly consists of metal and serves as ground plane of the antenna patches.

The antenna patches may be formed on the outside of the casing and connected to the interior of the base station by means of conductors. The antenna patches can be provided on an electrically non-conductive substrate which is supported on the casing of the base station. This ensures good and effective operation of the transmitting and receiving sections.

An electrically non-conductive layer may be provided on top of the antenna patches for protecting the patches and providing good visual appearance.

At least some antenna patches may comprise a multilayered structure including layers which provide parasitic capacitance. This feature increases the bandwith of the antennas to a desired value.

Basically, according to the invention, the base station is equipped with at least one receiving antenna patch and at least one transmitting antenna patch so that separate antennas are provided for transmitting and receiving operations. This allows high efficiency in sending and receiving signals as the antennas may be optimized for the transmitting and receiving operation, respectively. The antenna patch structure furthermore enables compact dimensions and thus compact size of the base station. The use of separate antennas for transmission and receiving operation allows improves multipath fading and lowers nearfield field strength (lower SAR) etc.

Preferably, the antennas are integrated into the casing of the base station, preferably to the cover thereof, for ensuring good antenna properties.

The invention provides a base station which may be produced with low costs, and has antenna properties with low profile and better performance than single antenna solution. Furthermore, the base station provides good fading performance and enables power flatness which is efficient for WCDMA (Wideband Code Division Multiple Access) and can be implemented comprising small antennas for space and/or polarization diversity. In addition, the patch antennas are of low cost, and require less complex filters for transmission and receipt. There is no longer any need to connect the transmission and receiving circuit components together which is necessary when having a single antenna. It is furthermore easier to improve the antenna and transmission and receiving circuit chains performance, the bandwidths, flatness, SWR ("Standing Wave Ratio"), signal to noise ratio and so on.

The possibility of using separate antennas for the transmission and reception furthermore provides a solution for any bandwidth problems in case the patch antenna should have narrow bandwidths. Due to the separation of the transmitting and receiving antennas, the bandwidths can be separately tailored for the transmission and receiving operation.

The patch antenna or patch antennas may also have stacked arrangement comprising two or more receiving patches so as to increase bandwidths, transmitting/receiving power, and the like, without negatively affecting the compactness of the base station structure in any significant manner.

PREFFERED EMBODIMENTS OF THE PRESENT INVENTION

Figure 1:
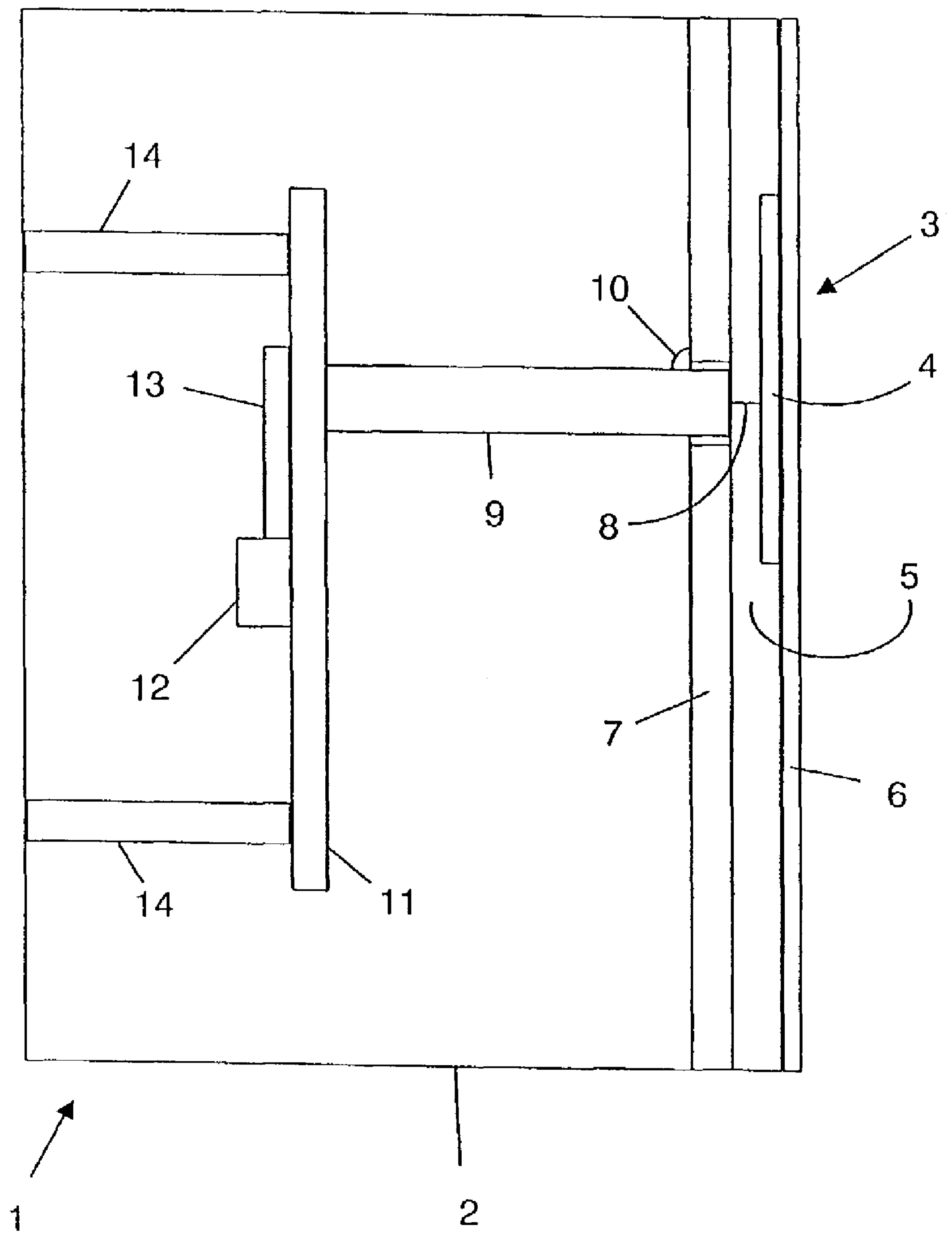
FIG. 1 shows a schematic structural arrangement, mainly in cross-section, of a first embodiment of the present invention.

FIG. 1 shows, partly in cross-section, a schematic representation of one embodiment of a base station 1 according to the invention. The base station 1 handles the signalling and traffic between user equipments (not shown) such as mobile phones, data terminals such as laptops and the like, on the one hand, a calling or called party, on the other hand, which may be situated in the same or another telecommunication network, and may be a user equipment or any other type of transmitting and/or receiving element. The base station 1 may be part of a local area network (LAN), a wide area network (WAN) such as a metropolitan area network (MAN), of an IP-based network, or any other type of network.

The base station 1 handles the traffic and signalling received from and transmitted to the user equipments located in the area covered by the base station 1, wherein the signal strength in relation to noises is high enough to allow data and signalling exchange with acceptable error rate. The term "base station" as used here, comprises not only base stations of specific services and systems such as DAWS (Digital Advanced Wireless Service) but also base transceiver stations (BTS) of a GSM system, or of any other communication or data transmitting system of a different standard such as UMTS (Universal Mobile Telecommunications System), GPRS (General Packet Radio Service), and the like.

The base station 1 shown in FIG. 1 comprises an outer casing 2 which contains all necessary internal components of the base station 1 such as receiving circuit section (RX part), transmitting circuit section (TX part), modulating/demodulating systems, decoding systems, and so on. The casing 2 comprises a front cover 3 which is shown in the right-hand part of FIG. 1 and closes one side, preferably the front side, used for radiating and receiving purpose.

The front cover 3 consists of several layers, as shown, and comprises a patch antenna which has an antenna patch 4 formed in a known manner from an electrically conductive thin layer which co-operates with a metallic layer (ground plane 7) of the cover 3. An intermediate layer 5 preferably made of electrically insulating, dielectric material is provided between the antenna patch 4 and the ground plane 7 so as to avoid any short circuit between the antenna patch 4 and the ground layer 7, and to enhance dielectric coupling between these elements. The layer 5 can also be eliminated and be replaced by a gap filled with air. In this case, some means against undesired contact, or changing distance, between the patch 4 and the ground plane 7 are provided, for instance by inserting distance-holding parts between the patch 4 and the ground plane 7, or between a layer holding the patch 4, and the ground plane 7.

As shown in FIG. 1, the antenna patch 4 is inserted into the layer 5 to a depth so that its surface is flush with the surface of the layer 5. Hence, the outer appearance of the cover 3 is quite smooth, and the danger of damaging caused by protruding parts is reduced.

An additional layer 6 consisting of plastic material or the like may be provided on the outer side of the cover 3 so as to increase the protection against damages, and to provide good optical appearance, for instance by hiding the antenna patch(es) 4 from visibility. The plastic material of layer 6 preferably contains sufficient coloring particles to provide a smooth, homogeneous appearance.

A feed 9 preferably consisting of a coaxial cable serves for conducting received electrical signals, or electrical signals to be sent, to and from antenna and the internal components of the base station provided for transmission (TX) and the reception (RX). The feed (coaxial cable) 9 has an inner conductor 8 which is electrically connected to the antenna patch 4. The outer ground (shield) conductor of the coaxial cable is electrically connected to the electrically conducting ground plane 7 such as indicated by reference numeral 10 which may represent a bent short connecting wire, a solder bump or any other electrical connection element for connecting the outer electrically conductive layer of the coaxial cable, and the grounded components for the base station 1. The other end of the coaxial cable (feed 9) is connected with a printed circuit board 11 internally arranged in the base station 1, for instance parallel to the front cover 3, and carrying the necessary elements for transmission (TX) and reception (RX) such as represented by a power amplifier 12 for amplifying signals (to be sent via patch antenna 4) to a sufficient level, and by a circuit 13 which is connected to the power amplifier 12 and provides the unamplified signals to be sent in modulated and/or coded form. Here, the circuit 13 is the TX circuit. The elements 12 and 13 may also be a transmission/reception-module (TRX) providing the necessary modulation and demodulation such as GMSK modulation, and a low frequency part for digital signal processing.

The circuit for reception (RX circuit) is not shown but is preferably arranged on the same printed circuit board 11 separate from the transmission section. The printed circuit board 11 is mechanically supported and fixed by supports 14 which may be bolts, screws or the like, and are connected to the printed circuit board 11 and the casing 2.

The coaxial cable 9 is inserted through a hole of the ground plane 7, as shown in FIG. 1, so as to positively avoid any danger of contact or insufficient distance between the inner conductor 8 and the ground plane 7.

The front cover 3 may for example have rectangular form with dimensions similar to same of DIN A4 sheet. The casing 2 has a sufficient height for incorporating all necessary elements.

Figure 2:
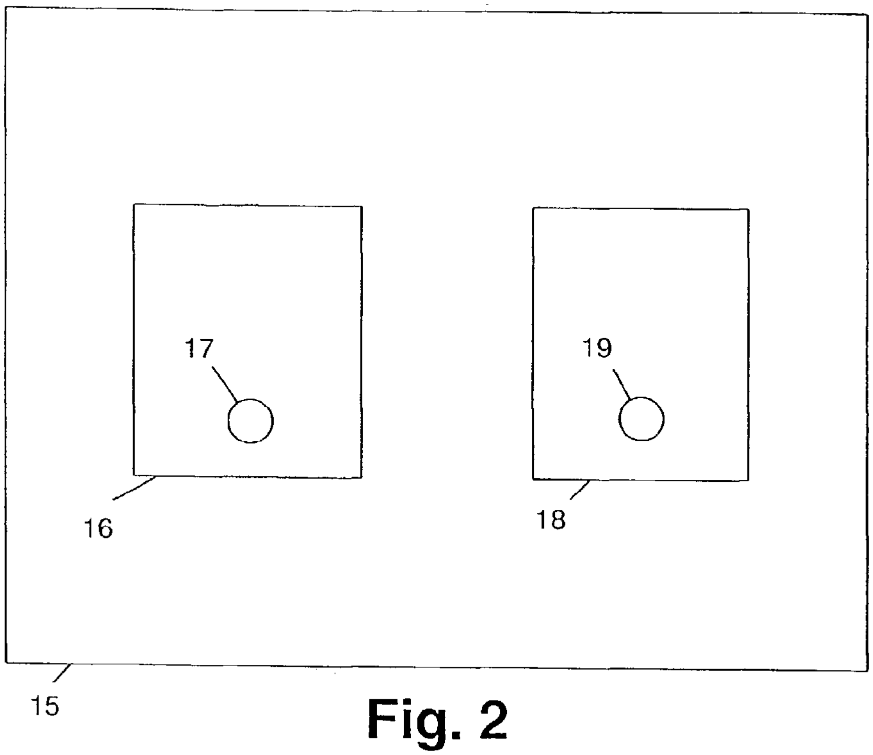
FIG. 2 illustrates an arrangement of patch antennas used in the first embodiment.

FIG. 2 shows an arrangement of two separate patch antenna elements 16, 18, one for transmission (TX) and one for reception (RX). The antenna elements 16, 18 are arranged on the outer side of the cover 15 of the base station (or base transceiver station BTS) 1 shown in FIG. 1. The antenna elements 16, 18 are arranged, as shown in FIG. 2, with a mutual distance so as to reduce interferences between the transmitting and receiving electrical fields and influences of a transmission process on the RX section. The antenna elements 16, 18 may be arranged approximately symmetrical to the center of the metallic base station cover 15 and are separated therefrom by an insulating, preferably dielectric layer (not shown), see FIG. 1. The antenna element 16 is connected to a feedline 17 for receiving the transmission signals from the TX section mounted on the printed circuit board 11. The feed 17 may be a coaxial cable such as cable 9 of FIG. 1.

Likewise, the patch antenna element 18 is connected to a feed 19 which may be a coaxial cable such as cable 9 of FIG. 1, and connects the patch antenna element 18 to the reception section (RX) mounted on the printed circuit board 11 (or on a separate printed circuit board). Although the feeds 17, 19 are shown as being visible from the front side of the cover 15, same will normally be hidden behind the patches 16, 18 as they extend from the back side of the antenna patches 16, 18 to the internal components of the base station. This statement also applies to the representation of the antenna configurations shown in FIGS. 3 and 4.

Although not shown in FIG. 2, a front layer covering the patches 16, 18 may be provided, such as layer 6 of FIG. 1, which does not influence the sending and transmitting electric fields This layer consists of an electrically non-conductive and, preferably non-dielectric material. Such a front layer may likewise be provided in the structures shown in FIGS. 3 to 6.

Figure 3:
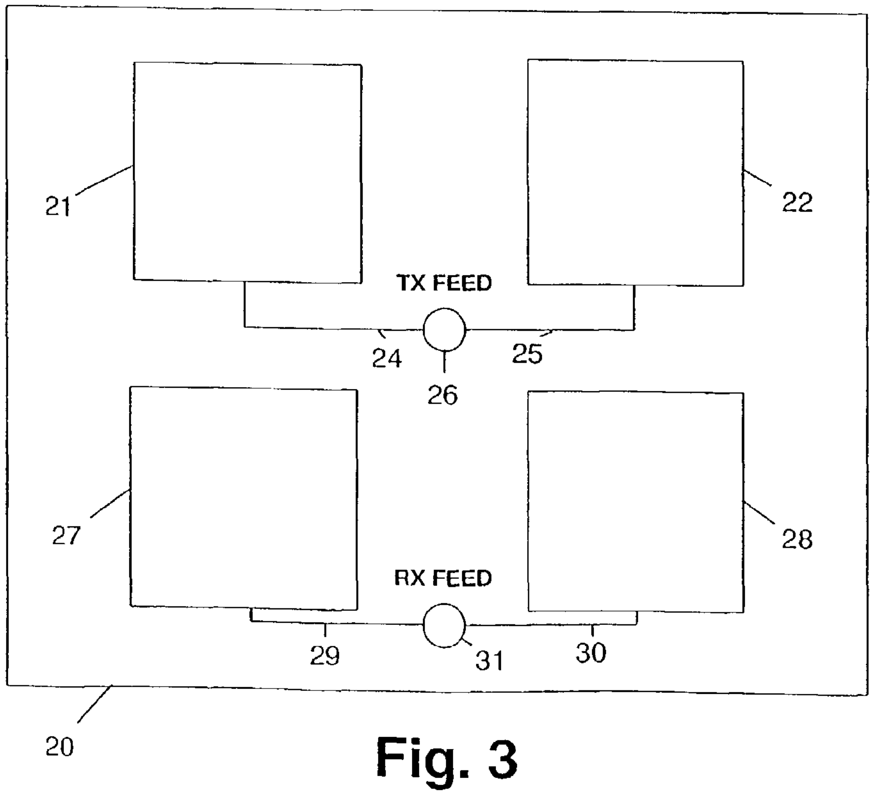
FIG. 3 shows a modification of the antenna array which may be used in the embodiment of FIG. 1 or any other type of structure of a base station.

FIG. 3 shows a further embodiment of an antenna arrangement having separate patch antennas for TX and RX. Here, two patch antennas 21, 22 are provided for transmitting signals which are connected to a common feed (TX-feed) 26. The feed 26 is symmetrically arranged between the patches 21, 22 and is connected therewith by means of lines (such as striplines) 24 and 25, respectively. The patches 21, 22 are arranged in the upper half of the front cover 20 of the base station (for instance base station 1 as shown in FIG. 1). Preferably, the patches 21, 22 are symmetrically arranged with regard to a vertical center line (not shown in FIG. 3) going through feed 26 and a feed 31.

In a similar manner, two patch antennas 27, 28 are provided for reception which are located in the lower half of cover 20 and are connected, via lines (such as microstrip lines) 29, 30, to the common feed (RX-feed) 31 located with the same distance to the patches 27, 28, i.e. located on the center line to which patches 27 and 28 (and 21, 22) are symmetrically arranged. The antenna arrangement shown in FIG. 3 provides strong electrical fields for transmitting signals and effective receipt of even weak signals transmitted from other equipments.

Figure 4:
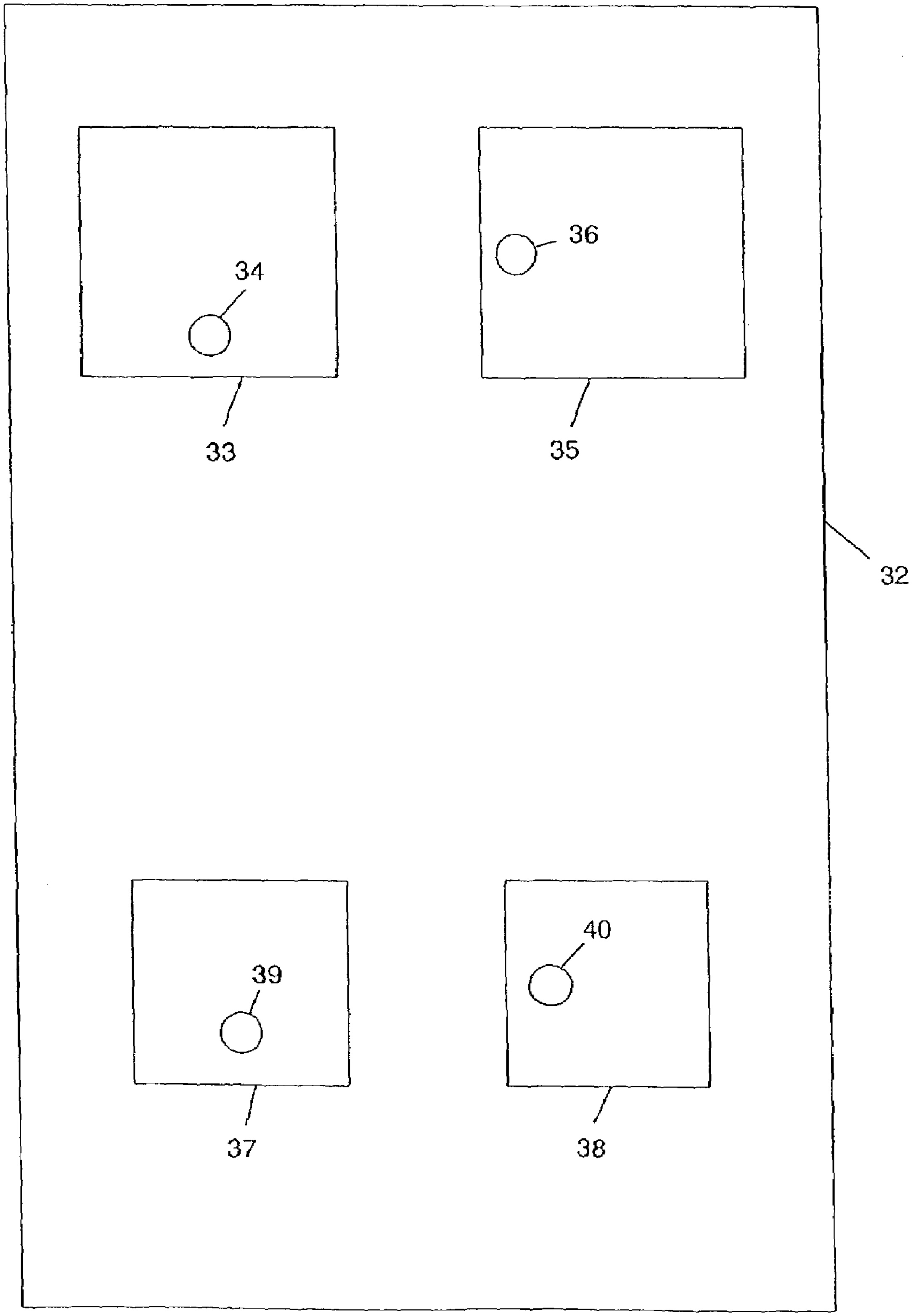
FIG. 4 shows a further modification of the antenna arrangement in a further embodiment of the invention.

FIG. 4 shows a further modification of the arrangement of the antenna structure of an embodiment of a base station according to the invention. Two patch antenna elements 33, 35 are provided for transmission (TX) which are located in the upper half (according to the representation of FIG. 4) of a front cover 32 of the base station 1. The patch antennas 33, 35 (TX) have feeds (preferably coaxial cables) 34, 36, respectively. The TX patches 33, 35 have different polarization so as to generate differently polarized electrical transmitting fields. This is represented by the different orientation and positioning of the feeds 34, 36.

In the lower half of the cover 32 (according to the representation of FIG. 4), two patch antennas 37, 38 are provided for reception (RX elements) which are connected to feeds 39, 40, respectively (preferably coaxial cables). Similar to the TX patches, the patch antennas 37, 38 are also arranged for different polarization, as represented by the different positioning and orientation of the feeds 39, 40.

As shown in FIG. 4, the TX patches 33, 35 may have a size different from same of the RX patches 37, 38. Here, the TX patches 33, 35 are larger than the RX patches 37, 38, for being able to generate stronger electrical transmission fields. However, according to necessity, design or planned installation location, the base station may also be equipped with RX patches 37, 38 having a larger size than the TX patches 33, 35. This larger size is also effective for lower reception frequency.

The structure and arrangement of the patches, as shown in FIG. 4, provides polarization diversity. The designing of the TX and RX antennas with different size makes it easier to improve the antenna and TX, RX chains performance, the standing wave ratio (SWR), the bandwidths (BW), the flatness, in particular power flatness as requested with WCDMA, and so on. Furthermore, there is no need to connect the TX and RX sections with each other as necessary when having only one single antenna. This allows the use of less complex TX, RX filters (duplex filters). Furthermore, the shown structures allow the use of space and polarisation diversity. In addition, the patch antennas are compact low-cost devices.

According to the embodiments, separate antenna or antennas are used for TX and RX which are integrated to the cover of the base station. In this way, it is also possible to use two or more antennas for transmitting and receiving signals, respectively. For example, using two antennas contributes to improve multi-path fading, lower nearfield field strength (lower SAR) and so on. Good fading performance is likewise provided. The patch antennas provide effective antenna function and are easily integrated to the cover of the base station because of their small size. They may also be installed at the side or back faces (walls) of the base station (instead at the front cover), depending on the design of the base station.

For instance, the base station may have outer dimensions of the front cover of e.g. approximately 200 mm to 300 mm. The size of square microstrip patch antennas preferably used in the described structures is roughly only 45 mm×45 mm for 1.8 GHz. The size of a circular antenna patch for 1.8 GHz is approximately 22 mm (a FR4 substrate may be used). Therefore, even small base stations provide sufficient place for installing several patches in the cover. For lower frequencies such as 900 MHz (GSM 900), a circular patch for transmitting and/or receiving in this frequency range has a size of approximately 43 mm. Still, there is sufficient room available for installing at least two separate antenna elements (for transmission and reception) at the outside of the base station, integrated to the front (or side or backside) wall(s) of the base station.

FIG. 4 shows one example of a possible patch configuration at the front side of the base station of for example A4 size. The TX patches 33, 34 may be connected to a common TX power amplifier such as power amplifier 12 (FIG. 1) mounted on a printed circuit board (such as 11) inside the frame 2 of the base station 1, using matching/splitter network. The probe feeds 34, 36 for the TX patches 33, 35 go through the metal frame of cover 32 (see structure of FIG. 1) which forms the ground plane for the patches 33, 34. On the metal frame, there is an electrically insulating substrate material supporting the patches 33, 34.

The RX patches 37, 28 may have the same kind of probe feeds as the TX patches 33, 34 as described above. In the example of FIG. 4, the two RX patches 37, 38 likewise have different polarisation.

Figure 5:
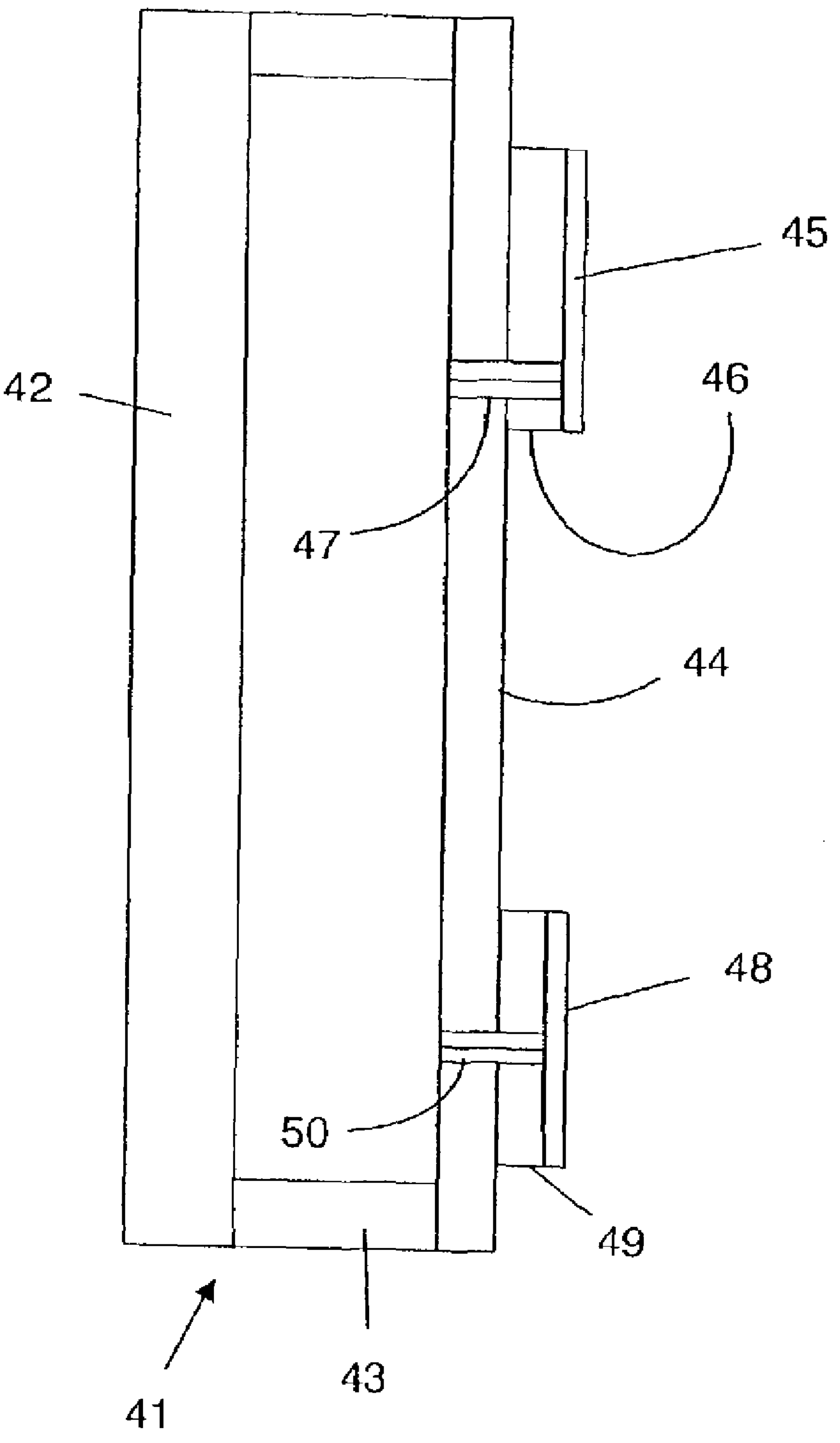
FIG. 5 is a schematic cross-sectional representation of another embodiment of the invention.

FIG. 5 shows a cross section of a further embodiment of a base station 41 in accordance with the invention. The internal circuit components and other structures of the base station 41 are not shown in FIG. 5. The frame (casing) of the base station 41 consists of a backside wall or plate 42, side walls 43 and a cover plate 44. All these components may consist of metal for providing high structural strength and good shielding, or may consist of other materials. In FIG. 5, two patch antennas 45 and 50 are shown in cross-section, one for transmission, and one for reception. However, there may also be provided two or more antenna patches for transmission and/or reception, respectively. On top of the preferably metallic cover plate 44 providing the ground plane for the antennas, a substrate 46, preferably of insulating material, is provided. On top thereof an electrically conductive antenna element (patch) 45 is arranged. The antenna element 45 is connected to a probe feed 47 which goes through the cover 44 and is internally connected (not shown) to the splitter/power amplifier of the TX circuit.

Likewise, an insulating substrate 49 is provided on top of the cover plate 44, and is covered by an electrically conductive antenna layer 48 providing a RX antenna patch. The antenna layer 48 is connected to a probe feed 47 guided through cover plate 44 and internally connected (not shown) to the reception section comprising for instance a demodulating circuit and other components.

A suitable patch size for GSM 1800 (GSM=Global System for Mobile Telecommunications) (1.8 GHz) is, for the TX patch 45, approximately 35 mm×35 mm. The substrate may consist of FR 4 material having a dielectric constant of 4.40 and a loss tangent of 0.01. The substrate may e.g. have a thickness of approximately 6.5 mm. The bandwidth for SWR 2 (standing wave ratio) is 4.5%. The RX patch(es) 48, 49 are somewhat larger and may have a size of approximately 37 mm×37 mm. The bandwidth for SWR2 is 4.3%. The TX band for GSM 1800 is approximately 1805 to 1880 MHz. The RX band is approximately 1710 to 1785 MHz.

Figure 6:
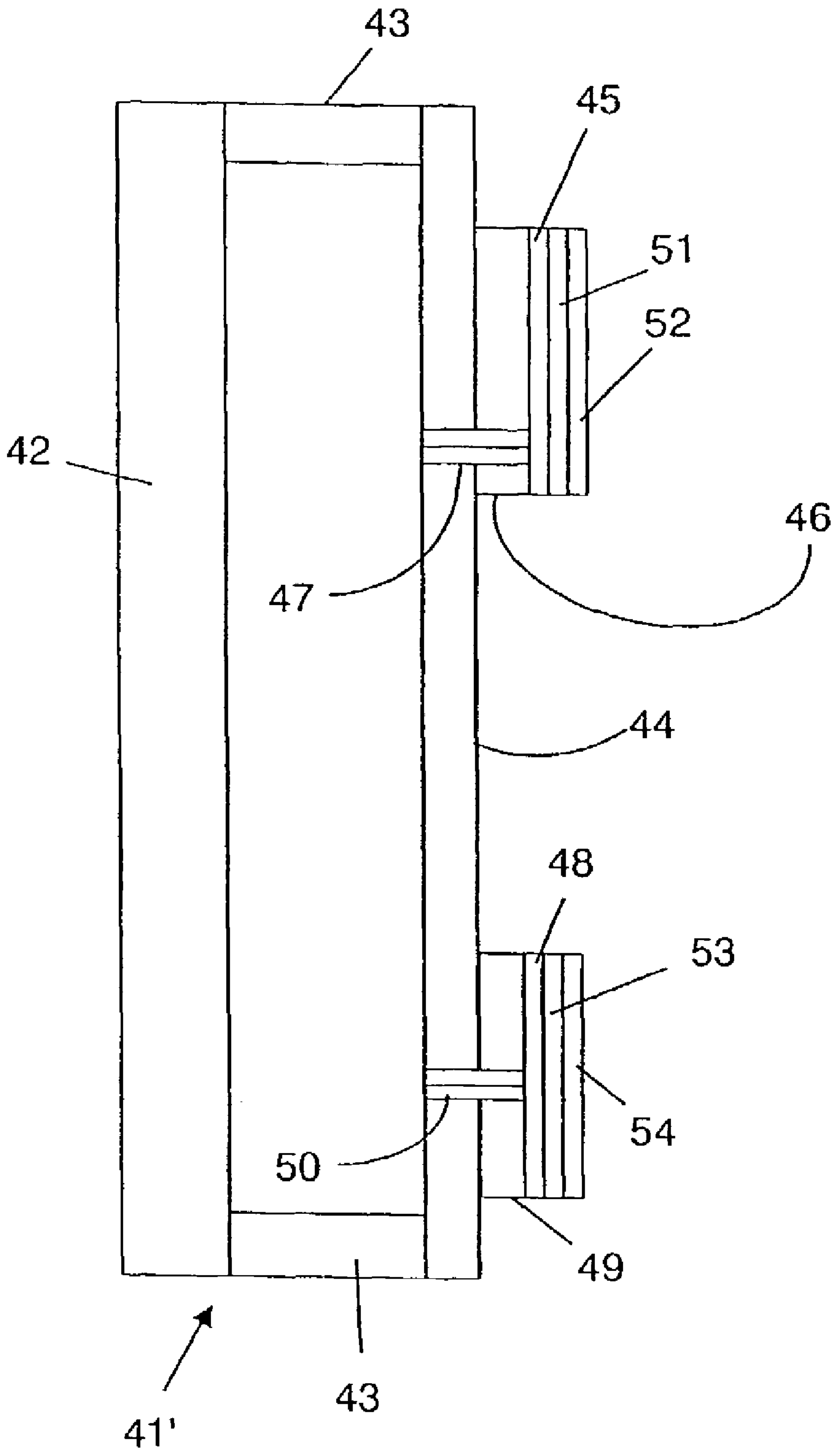
FIG. 6 is a schematic cross-sectional representation of a further embodiment of the invention.

Wider bandwidths may be achieved by using stacked patches of parasitic patch configurations. An example is shown in FIG. 6. FIG. 6 illustrates a base station 41' which has substantially the same structure and configuration as same of FIG. 5. The above description of FIG. 5 therefore likewise applies to the embodiment of FIG. 6. In addition, the embodiment of FIG. 6 comprises additional patches 51, 52 provided on top of patch 45, and additional patches 53, 54 provided on top of patch 48. These additional patches provide parasitic capacitance and therefore lead to wider bandwidths for transmission and receipt.

The above indications of preferred sizes are not to be understood in a restricting manner. Other dimensions are covered as well. In addition, the number of TX and/or RX patches may be varied according to design or necessity so as to include only one or more than two patches for transmission and reception each.

Although not shown in detail, the patches may have a microstrip patch design such as shown in U.S. Pat. No. 4,724,443, wherein an additional microstrip feed element is provided in parallel and between the preferably metallic patch layers 4, 16, 18, 21, 22, 27, 28, 33, 35, 37, 38, 45, 48, and the parallely extending, preferably metallic ground plane 7, 15, 20, 32, 44 (which is connected to the ground potential of the circuit components inside the base station).

The use of separate antennas for transmission and receipt provides some isolation between the TX and RX paths because these paths are no longer "physically" connected to each other. There is not only space between the TX/RX antennas but also their antenna operation frequency is different, and they may be independently optimized for these different frequencies.

The invention claimed is:

1. A base station, comprising:

a casing;

a transmitting and receiving device housed in the casing; and an antenna connected to the transmitting and receiving device, wherein the antenna is formed as a patch antenna that comprises at least one receiving antenna patch and at least one transmitting antenna patch, wherein the receiving antenna patch is attached to the casing of the base station, wherein the transmitting antenna patch is attached to the casing of the base station, and wherein the casing contains internal components of the base station comprising a receiving circuit section, transmitting circuit section, modulating/demodulating systems, and decoding systems, wherein the casing has a cover plate configured to provide structural strength, shielding, and a ground plane for the antenna, wherein on top of the cover plate, insulating substrates are provided, wherein on top of the insulating substrates the electrically conductive receiving and transmitting antenna patches are arranged, wherein probe feeds are provided, which go through the cover plate to internal components of the base station and which are connected to the antenna patches, wherein additional patches are provided on top of the receiving antenna patch, and wherein additional patches are provided on top of the transmitting antenna patch, the additional patches providing parasitic capacitance increasing bandwidths for transmission and reception.

2. The base station according to claim 1, further comprising:

at least two separate receiving antenna patches, which are connected to a common receiving feed line for connection to a receiving circuit of the base station.

3. The base station according to claim 1, further comprising:

at least two separate transmitting antenna patches, which are connected to a common transmitting feed line for connection to a transmission circuit of the base station.

4. The base station according to claim 2, further comprising:

at least two separate transmitting antenna patches, which are connected to a common transmitting feed line for connection to a transmission circuit of the base station.

5. The base station according to claim 1, wherein a size of the receiving antenna patch is different from a size of the transmitting antenna patch.

6. The base station according to claim 1, wherein the casing of the base station comprises metal and is configured to serve as ground plane of the antenna patches.

7. The base station according to claim 1, wherein the antenna patches are formed on the outside of the casing and are connected to an inside of the base station by conductors.

8. The base station according to claim 1, wherein the antenna patches are provided on an electrically non-conducting substrate that is supported on the casing of the base station.

9. The base station according to claim 1, further comprising:

an electrically non-conductive layer on top of the receiving and transmitting antenna patches.

10. The base station according to claim 1, wherein at least some of the receiving and transmitting antenna patches comprise a multi-layered structure including layers that provide parasitic capacitance.

11. A base station, comprising:

casing means for encasing contents of the base station;

transmission means for transmitting and receiving housed in the casing means; and propagation means for sending and receiving an airborne signal connected to the transmission means, wherein the propagation means is formed as a patch antenna that comprises at least one receiving antenna patch and at least one transmitting antenna patch, wherein the receiving antenna patch is attached to the casing means, wherein the transmitting antenna patch is attached to the casing means, and wherein the casing means contains internal components of the base station comprising a receiving circuit section, transmitting circuit section, modulating/demodulating systems, and decoding systems, wherein the casing means has a cover means for providing structural strength, shielding, and a ground plane for the antenna, wherein on top of the cover means, substrate means for insulating are provided, wherein on top of the substrate means the electrically conductive receiving and transmitting antenna patches are arranged, wherein probe feeds are provided, which go through the cover means to internal components of the base station and which are connected to the antenna patches, wherein additional patches are provided on top of the receiving antenna patch, and wherein additional patches are provided on top of the transmitting antenna patch, the additional patches providing parasitic capacitance increasing bandwidths for transmission and reception.

12. A base station manufacturing method, comprising:

providing a casing;

housing a transmitting and receiving device in the casing;

connecting an antenna to the transmitting and receiving device;

forming the antenna as a patch antenna that comprises at least one receiving antenna patch and at least one transmitting antenna patch;

attaching the receiving antenna patch to the casing of the base station;

attaching the transmitting antenna patch to the casing of the base station;

containing, by the casing, internal components of the base station comprising a receiving circuit section, transmitting circuit section, modulating/demodulating systems, and decoding systems;

providing the casing with a cover plate configured to provide structural strength, shielding, and a ground plane for the antenna;

providing insulating substrates on top of the cover plate;

arranging the electrically conductive receiving and transmitting antenna patches on top of the insulating substrates;

providing probe feeds that go through the cover plate to internal components of the base station;

connecting the probe feeds to the antenna patches;

providing additional patches on top of the receiving antenna patch;

configuring additional patches on top of the transmitting antenna patch; and configuring the additional patches to provide parasitic capacitance increasing bandwidths for transmission and reception.

* * * * *